(Model.)
E. B. PORTER.
FISHING REEL.
No. 374,319. Patented Dec. 6, 1887.
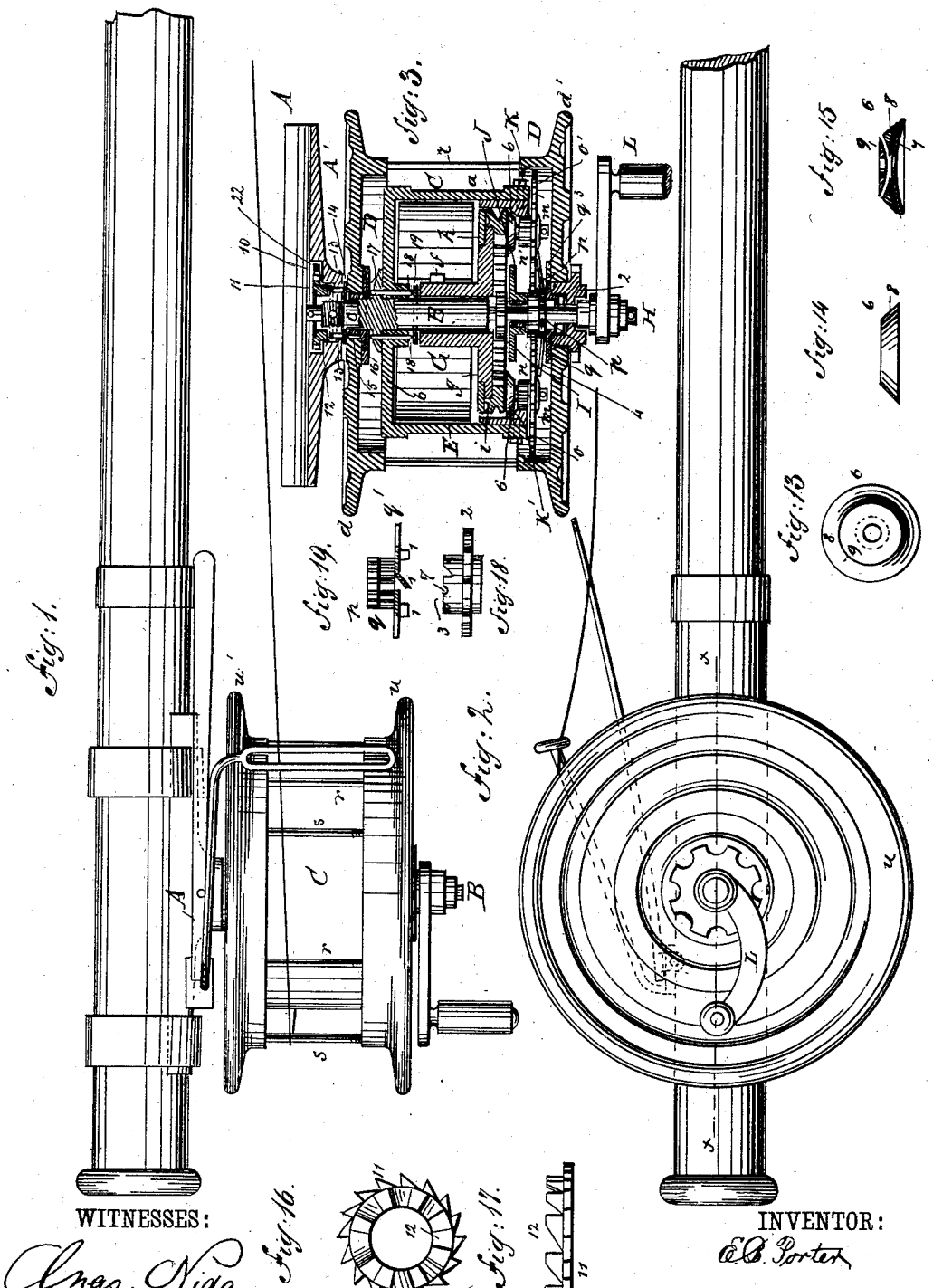
WITNESSES:
Chas. Nida
C. Sedgwick
INVENTOR:
E. B. Porter
BY Munn & Co.
ATTORNEYS.

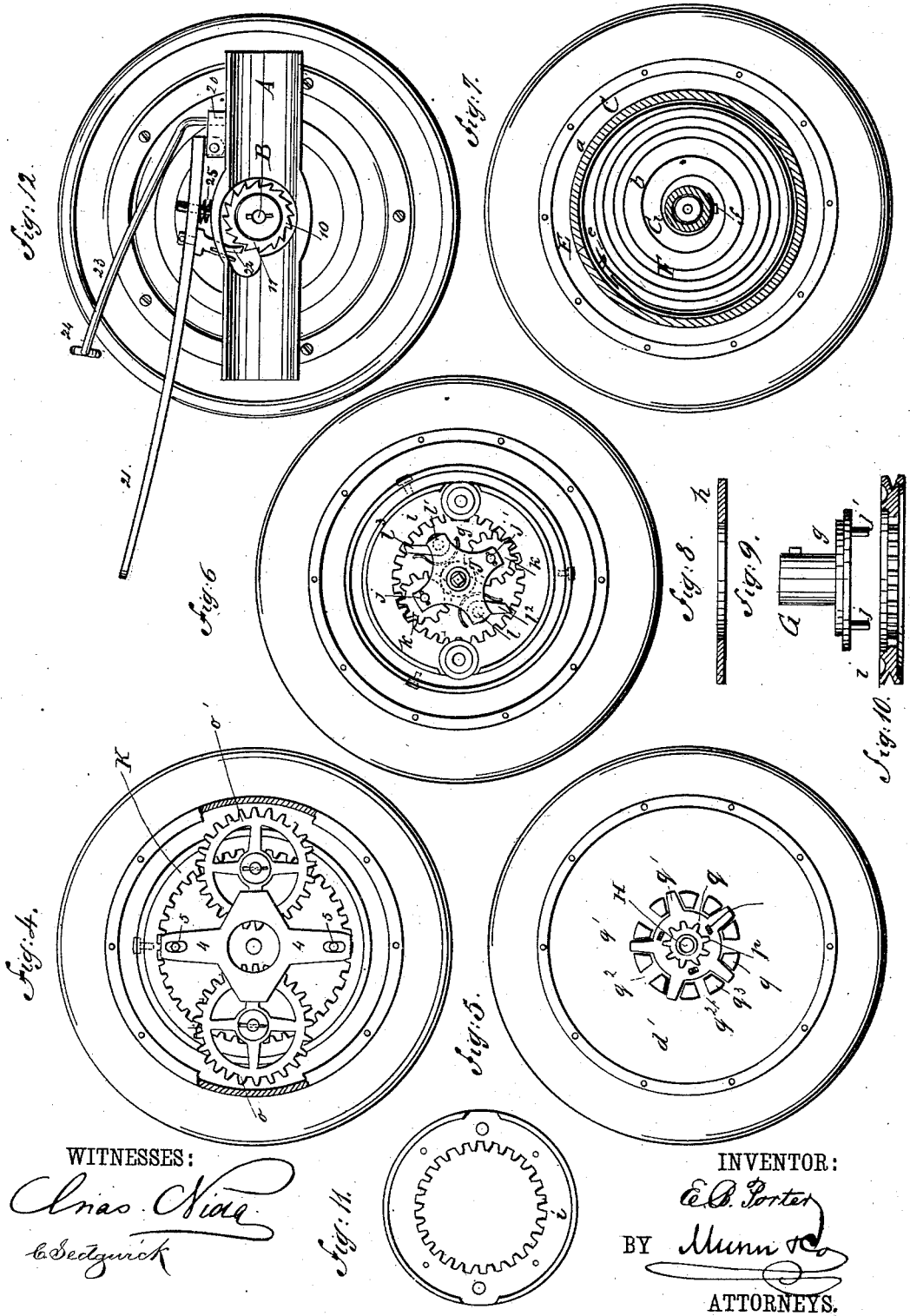

UNITED STATES PATENT OFFICE.

ELBERT BALL PORTER, OF PENN YAN, NEW YORK.

FISHING-REEL.

SPECIFICATION forming part of Letters Patent No. 374,319, dated December 6, 1887.

Application filed January 27, 1887. Serial No. 225,656. (Model.)

*To all whom it may concern:*

Be it known that I, ELBERT BALL PORTER, of Penn Yan, in the county of Yates and State of New York, have invented a new and Improved Fishing-Reel, of which the following is a specification, reference being had to the annexed drawings, forming a part thereof, in which—

Figure 1 is a side elevation of my improved reel. Fig. 2 is a front elevation of the same. Fig. 3 is a transverse section taken on line $xx$ in Fig. 2. Fig. 4 is a plan view with one side of the reel removed and parts broken away to more clearly show the construction. Fig. 5 is a side elevation of one end of the reel, showing the inner side. Fig. 6 is a front elevation of the gearing with the outer wheels removed to more clearly show the construction. Fig. 7 is a transverse section taken through the center of the reel and the spring inclosed thereby. Figs. 8, 9, and 10 show the different parts of the friction device in detail. Fig. 11 is a side elevation of the internally-toothed traveling ring. Fig. 12 is a rear elevation of my improved reel. Figs. 13, 14, 15, 16, and 17 are detail views of the parts of the brake mechanism, and Figs. 18 and 19 are detail views of the detaching devices.

Similar letters of reference indicate corresponding parts in all the views.

The object of my invention is to provide an efficient reel by which a perfect control of the line and the fish may be secured, and in which the tension upon the line may be accurately regulated; also, to furnish a spring-actuated reel which will wind any desired length of line, and in which the line may be paid out to any extent without interfering with the action of the spring or gearing connected therewith.

My invention consists in a fixed spring-barrel, a friction-spring placed in the barrel, arranged to bear against its inner wall, and provided with a hook for receiving the outer end of the driving-spring, and in the combination, with the said spring-barrel, of a reel inclosing the barrel, and a system of planetary gearing interposed between the barrel and reel for conveying motion from the spring to the reel, and a system of gearing for winding the spring.

It also further consists in an arrangement of a friction-clutch interposed between the spring and planetary gearing, all as hereinafter more fully described.

To the support A is fixed a stud, B, to which is secured a spring-barrel, C, consisting of a hollow cylinder, $a$, secured to a base-plate, $b$.

Between the base-plate $b$ of the spring-barrel C and the shoulder $c$ of the stud B is placed the head $d$ of the reel D.

In the spring-barrel C is placed a brake-spring, E, consisting of a flat steel spring arranged to press outwardly against the inner surface of the wall of the barrel C. The brake-spring E is provided with a hook, $e$, for receiving the outer end of the main spring F, the inner end of which is received on a hook, $f$, carried by a sleeve, G, placed loosely on the stud B. The sleeve G is provided with a flange, $g$, outside of the spring F, the said flange being rabbeted on its inner surface to receive the friction-ring $h$.

To the ring $h$ is attached an internally-toothed ring, $i$, which projects over the edge of the flange $g$ and bears with a light friction on the said flange. The ring $i$ is grooved in its periphery and on the surface which contacts with the ring $h$ to reduce its weight.

The stud B is bored axially to receive the winding-arbor H, upon which is secured a pinion, I.

On two studs, $j\ j'$, projecting from the flange $g$, are journaled the planet-wheels $k\ k'$, which mesh into the internal teeth of the ring $i$ and into the pinion I on the winding-arbor H, so that when motion is imparted by the pinion on the winding-arbor to the planet-wheels $k$ $k'$ they will travel around the inner surface of the ring $i$.

A cross-shaped plate, J, having two opposite arms secured to the studs $j\ j'$, turns loosely on the arbor H and serves to steady the upper end of the arbor, so as to prevent wabbling and to preserve the working distances of the pinion and the toothed ring.

Two studs, $l\ l'$, projecting from the outer face of the flange $g$, receive the spring-actuated clicks $l^2\ l^3$, which engage the teeth of the ring $i$ and retain the spring F under tension.

To the outer edge of the barrel C is secured an internally-toothed ring, K, provided with a beveled inner surface, K'. Studs $m\ m'$ project from the outer face of the ring $i$ at diametrically-opposite points and carry pinions $n\ n'$, which mesh into the teeth of the ring K.

To the pinions $n\ n'$ are secured spur-wheels $o\ o'$, which engage a pinion, $p$, placed loosely on the winding-arbor H. The pinion $p$ is provided with a flange, $q$, having arms $q'$, which are adapted to drop into notches $q^2$, formed in the rim $q^3$, projecting inwardly from the head $d'$ of the reel D.

In the flange $q$ are formed three beveled teeth, 1 1 1, preferably made by cutting a tongue upon the flange and pressing it outward.

In the center of the head $d'$ of the reel D is inserted a sleeve, 2, provided on its inner end with three teeth, 3 3 3, adapted to engage the beveled teeth 1 1 1 of the flange $q$ when the said sleeve is turned. The summit of each tooth 3 is provided with a central shallow notch, 7, for receiving the teeth 1 1 1. A spring-arm, 4, extending across the traveling ring $i$, is supported by studs 5, projecting from the said ring, and the center of the spring-arm is apertured to admit the pinion $p$, with the flange $q$. The said spring-arm 4 tends to press the flange $q$ outward into engagement with the notches $q^2$ in the head of the reel, and when the said notches are in engagement with the head of the reel the reel is made to turn with the pinion $p$. The flange $q$ is thrown out of engagement with the head $d'$ of the reel by turning the sleeve 2 on the arbor H, thus causing the beveled teeth 3, by engagement with the teeth 1 of the flange $q$, to push the said flange inward and disengage the arm $q'$ from the notches $q^2$. When thus arranged, the reel surrounding the drum and driving mechanism is allowed to turn independently of the driving mechanism, the sleeve 2 in that case forming a bearing for the head $d'$.

Upon the studs $m$ $m'$, outside of the wheels $o$ $o'$, are placed spring-collets of the usual description, held in place by pins passing transversely through the said studs near their outer ends.

Between the pinions $n$ $n'$ and the traveling ring $i$, and upon the studs $m$ $m'$ are placed the beveled friction-wheels 6, the construction of which is shown in detail in Figs. 13, 14, and 15. The wheels are adapted to roll upon the beveled surface K' when pushed forward into engagement with the surface by means of mechanism presently to be described. Each of the wheels 6 consists of a concavo-convex spring-washer, 7, adapted to fit the shoulders of the studs $m$ $m'$, a middle section, 8, having a beveled periphery and concave sides, and a plano-convex washer, 9. When the ring $i$ is pushed outward and the wheels 6 are brought into engagement with the beveled surface K', the double-concave beveled ring 8 is crowded between the washers 7 9, producing the required amount of friction. As the frictional surfaces roll upon each other, they insure a uniform wear, so that the brake device will be rendered durable and certain in its action. Wires $r$ project from the head $d$ and are received in holes in the head $d'$, and intermediate between the wires $r$ are inserted screws $s$, which pass through the head $d$ into threaded holes in the head $d'$. The screws $s$ and the wires $r$ form the body of the reel on which the line is wound.

Although I have described and shown a reel whose body is formed of the screws and wires, I do not confine myself to this construction, as a light band or ring of metal, either corrugated or plain, may be substituted for the wires and screws. The heads $d$ $d'$ are chambered to receive the barrel C and the actuating mechanism of the reel, and are provided with flanges $u$ $u'$, for confining the line on the reel.

A hand-crank, L, is secured to the winding-arbor H for operating the winding mechanism.

In a recess, 10, in the support A is placed a ratchet-wheel, 11, which turns on the rearwardly-projecting end of the stud B, and is provided with a series of beveled teeth, 12, projecting from its inner face, as clearly shown in Figs. 16 and 17. Pins 13 project through holes in the support A and are engaged at one end by the beveled teeth 12, and bear at the opposite end upon an annular plate, 14, placed between the reel-head $d$ and the support A. The plate 14 rests upon a collar, 15, formed on a flange, 16, and projecting through the head $d$ of the reel. The flange 16 is recessed and provided with a steel bearing-plate, 17, upon which rest the ends of pins 18, which extend through holes in the boss of the barrel C and engage an annular plate, 19, surrounding the stud B and pressing against the inner end of the sleeve G.

On the base A is formed an ear, 20, in which is pivoted a key-lever, 21, carrying a spring-actuated pawl, 22, which is adapted to engage the ratchet-wheel 10. The key-lever 21 is guided by a stud, 25, projecting from the base through an aperture in the lever and surrounded by a spiral spring which tends to push the lever away from the base A. To the ear 20 is also secured a bent wire, 23, provided with an oblong loop, 24, which projects across the face of the reel and forms a guide for the line.

The operation of my improved reel is as follows: By turning the hand-crank L motion is imparted through the pinion I to the planet-wheels $k$ $k'$, which roll around the inner periphery of the toothed ring $i$, carrying the flange $g$ with them, the said ring $i$ during this operation being held stationary by the pinions $n$ $n'$, which engage the internally-toothed ring K and the wheels $o$ $o'$, attached to the said pinions, and mesh into the pinion $p$, attached to the reel, the reel being prevented from turning by the brake. The unwinding of the main spring F is prevented by the clicks $l^2$ $l^3$, which engage the internal teeth of the ring $i$, and the spring is prevented from being wound beyond the limit of safety by the slipping of the friction-spring E. When the reel D is released by disengaging the brake in the manner to be presently described, the main spring F, acting through the sleeve G and flange $g$ formed thereon, (the rings $h$ $i$ clamping the edge of the flanges $g$ and the clicks $l^2$ $l^3$ engaging the teeth of the ring $i$,) carries the pinions $n$ $n'$ around the fixed internally-toothed ring K, causing them to rotate on their studs $m$ $m'$, carrying with them the spur-wheels $o$ $o'$, which, by their engagement with the pinion $p$, attached to the reel, cause the reel to revolve rapidly. The winding of the main spring F and the rotation of the reel may proceed simultaneously, so that the amount of line taken in by the reel will not be limited by the length of the main spring. The line Q passes through the loop 24 and is attached to one of the screws $s$ or wires $r$. The line is wound in the manner described, and may be paid out against the tension of the spring F, so that it is always kept taut; and if it is desired to allow the line to pay out more freely the pinion $p$ may be disengaged from the reel by turning the sleeve 2 in the manner already described, when the reel will revolve independently of the spring and mechanism connected therewith. When it is desired to oppose the paying out of the line more or less, the key-lever 21 is pushed down, thus turning the ratchet-wheel 10 and bringing the beveled faces of the teeth 12 into engagement with the pins 13, thus imparting an outward movement to the sleeve G through the annular plate 14, collar 15, flange 16, wearing-plate 17, pins 18, and annular plate 19. The outward movement of the sleeve G carries the friction-wheels 6 outward into engagement with the beveled surface K' of the ring K, producing more or less friction by the crowding in of the double-concave toothed ring 8 between the washers 7 and 9.

The slipping of the ring $i$ on the flange $g$ of the sleeve G prevents any sudden jerks on the spring when a sudden strain is brought upon the line Q.

It will be observed that none of the connections between the reel and the spring and between the spring and the winding mechanism are positive, so that none of the parts can be overstrained either in winding the spring or in paying out the line. It will also be noticed that as the reel is held still by the brake the reel itself may yield under undue strain of the line Q without breaking the line.

Having thus fully described my invention, I claim as new and desire to secure by Letters Patent—

1. In a fishing-reel, the combination, with the fixed spring-barrel, the reel arranged to revolve around said barrel, a flanged sleeve receiving a stud, intermediate mechanism between the flange of said sleeve and said reel, and the actuating main spring contained by the barrel, of a friction-spring connected with the outer end of the main spring and pressing against the inner wall of the main spring barrel, substantially as described.

2. In a fishing-reel, the combination of the fixed barrel C, the stud B, the sleeve G, placed loosely on the stud and provided with the flange $g$, the main spring F, the reel D, arranged to revolve around the fixed barrel C, and mechanism intermediate between the flange $g$ and reel D for communicating motion from the flange to the reel, substantially as described.

3. The combination of the fixed barrel C, provided with the internally-toothed ring K, the main-spring F, contained by the barrel, the sleeve G, connected with the spring and provided with the flange $g$, the internally-toothed ring $i$, mounted on the flange $g$, the planet-wheels $k\ k'$, carried by the flange and engaging the toothed ring $i$, the winding-arbor H, journaled at the center of the barrel C, the pinion I, secured to the winding-arbor and engaging the planet-wheels $k\ k'$, the clicks $l^2\ l^3$, carried by the flange $g$, the pinions $n\ n'$, carried by the ring $i$ and engaging the internally-toothed ring K, wheels $o\ o'$, carried by the pinions $n\ n'$, the pinion $p$, turning loosely on the winding-arbor H and engaged by the wheels $o\ o'$, and the reel D, attached to the pinion $p$ and surrounding the barrel C, substantially as described.

4. In a fishing-reel, the combination, with the axially-bored stud B, provided with the shoulder $c$, and the barrel C, secured to the stud, of the winding-arbor H, journaled in the bore of the stud B, the reel D, arranged to turn on the stud B and winding-arbor H, the spring F, contained by the barrel C, and mechanism intermediate between the spring and winding-arbor and between the spring and reel for winding the spring and turning the reel, substantially as described.

5. In a fishing-reel, the combination, with the reel-carrying pinion and reel-head having a notched internal flange, of a collar carried by the pinion and provided with radial arms and inclined teeth, and a sleeve having a notched end adapted to engage the inclined teeth of the collar for connecting the reel with the driving mechanism and disconnecting it therefrom, substantially as specified.

6. In a fishing-reel, the combination, with the reel-carrying mechanism, of a beveled friction brake-surface and one or more beveled brake-wheels formed of a double-concave middle portion having a beveled edge adapted to roll upon the said beveled brake-surface, and two concave washers adapted to hold the bevel-faced central portion of the friction-wheel in the position of use, substantially as specified.

7. In a fishing-reel, the combination, with the beveled brake surface K' and the beveled brake-wheels 6, of the ratchet-wheel 10, provided with inclined teeth 12, the pins 13, adapted to be engaged by the inclined teeth 12, and mechanism intermediate between the pins 13 and the brake-wheels 6, substantially as specified.

8. The combination of the reel D, provided with the head $d'$, having the internally-notched rim $q^3$, the sleeve 2, having teeth provided with shallow notches in the ends thereof, the pinion $p$, and the flange $q$, attached thereto and provided with arms $q'$ and inclined teeth 1, substantially as specified.

ELBERT BALL PORTER.

Witnesses:
E. M. CLARK,
C. SEDGWICK.